INVENTOR.
WALTER D. ARCHEA

Patented Aug. 25, 1936

2,052,271

UNITED STATES PATENT OFFICE 2,052,271

COMBINED MILLING AND BORING MACHINE

Walter D. Archea, Cincinnati, Ohio, assignor to The Cincinnati Milling Machine Co., Cincinnati, Ohio, a corporation of Ohio Application March 8, 1935, Serial No. 10,125

9 Claims. (Cl. 29—26)

This invention relates to machine tools and more particularly to a combined milling and boring machine.

One of the objects of this invention is to provide a machine of the character described which is immediately utilizable for either purpose without the necessity of making changes or alterations in the machine proper.

Another object of this invention is to provide in connection with a machine of the character described an improved transmission mechanism whereby the rate and direction of either the milling spindle or the boring spindle may be controlled by the same means.

Another object of this invention is to provide a machine of the character set forth in which the tool spindles may be conveniently adjusted, either angularly or laterally of their axes without involving complications in their actuating mechanism.

Another object of this invention is to provide a machine of the character set forth having a carrier with a slidable member which serves the dual function of providing an arbor support for a milling tool and serves as means for supporting and feeding a boring tool spindle.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1:
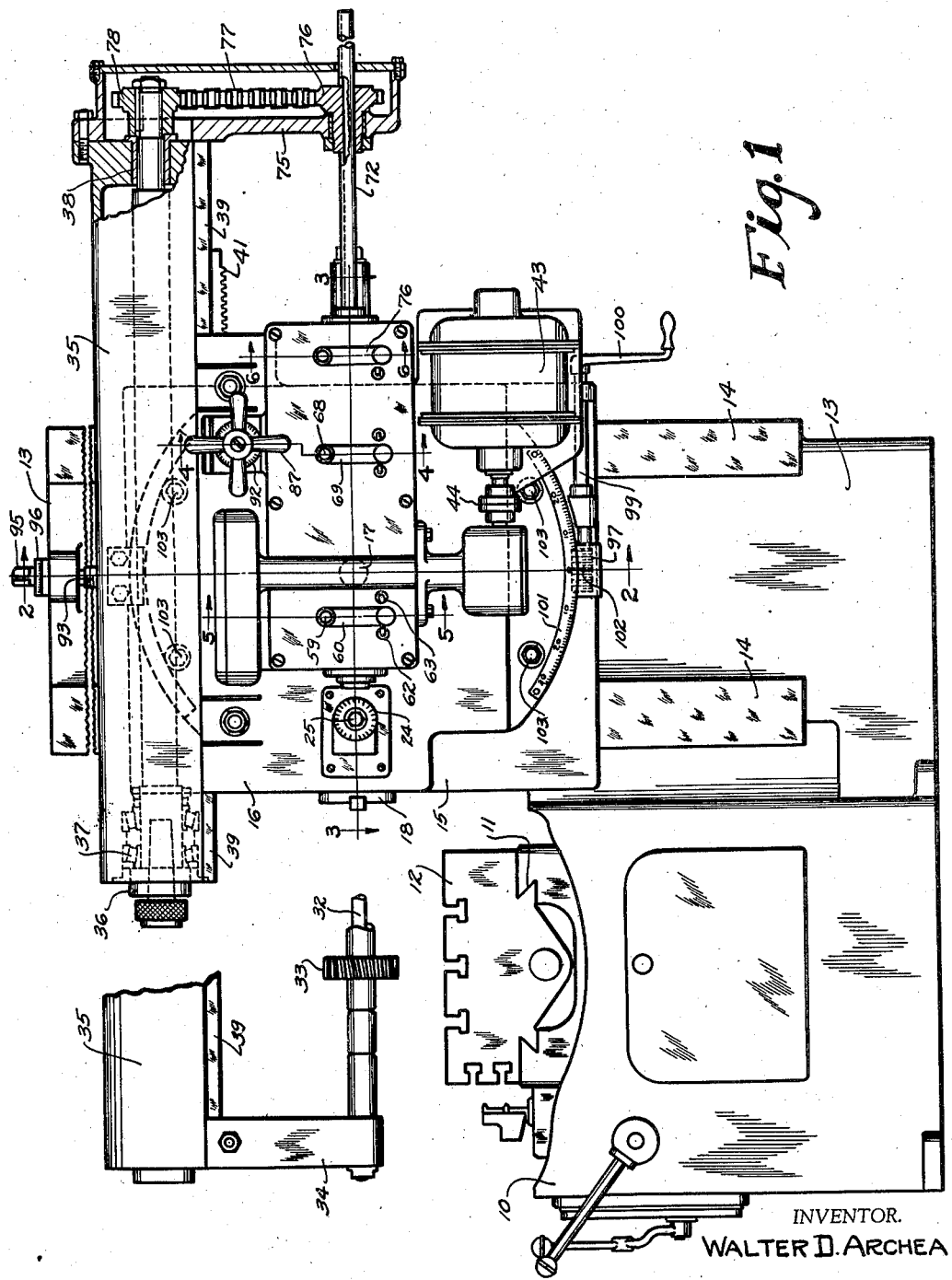
Figure 1 is an elevation of a machine tool embodying the principles of this invention.

In the preferred exemplification of the invention shown in Figure 1, the reference numeral 10 indicates the bed of the machine having guide ways 11 for receiving and guiding a work support 12. The work support or work table may be reciprocated by any suitable form of mechanical or hydraulic transmission, preferably such as that used for milling machine tables, and, since such transmissions are well known in the machine tool art and since the particular form of transmission does not constitute any part of the present invention, the same has not been illustrated herein.

Figure 3:
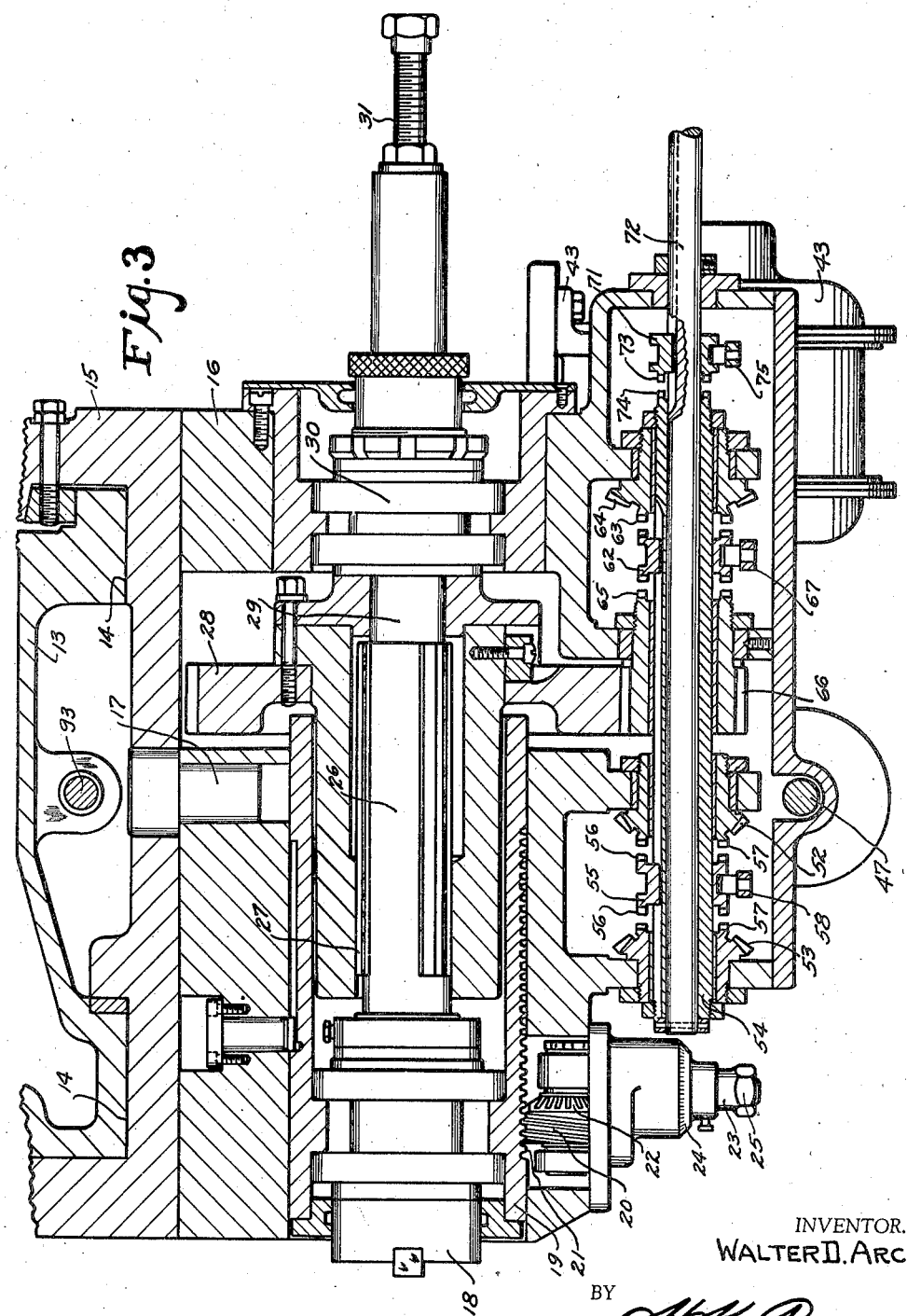
Figure 3 is a horizontal section through the carrier as viewed on line 3—3 of Figure 1.

Uprising from one side of the bed is a column 13 having vertical guideways 14 formed upon one side thereof for receiving and guiding a tool supporting means comprising a sub-base member 15 in which is formed surfaces which are complementary in shape to the guiding surfaces 14, as more particularly shown in Figure 3 of the drawings; and a carrier member 16 which is pivotally mounted on the pin 17 for angular adjustment, the pin 17 being secured in the sub-base 15.

As shown in Figure 3, the carrier has a milling tool spindle 18 journaled in a quill 19, the latter being axially movable in the carrier by means of conventional mechanism comprising a spiral worm 20 which meshes with complementary teeth 21 formed in the side of the quill. The worm 20 may be rotated by means of a beveled gear 22 meshing with a similar bevel gear secured to the end of shaft 23. This shaft may have a suitable indicating dial 24 secured thereto for indicating the amount of movement, and the end of the shaft may be provided with a hexagon head 25 for receiving a suitable wrench for rotation thereof.

The spindle has a spline shank 26 which extends through a spline bore 27 formed in the hub of the bull gear 28, which serves as a driving means for the spindle in all axial positions thereof. The end 29 of the spindle is reduced and is passed through antifriction bearings 30 in the rear of the carrier for supporting the rear end of the spindle. The reduced end 29 of the cutter spindle is elongated to provide support for the rear end of the spindle when the same is adjusted toward the table by the quill mechanism. The usual drawbar 31 extends axially through the center of the spindle for securing the shank of a milling cutter or arbor in the nose of the spindle.

When a cutter arbor, such as 32, Figure 1, is utilized for supporting a milling cutter, such as 33, the outboard end of the arbor is supported by a pendent 34 which has a suitably formed guideway for attachment to the underside of a longitudinally adjustable member 35, which member serves as an overarm for supporting the pendant 34 when the machine is utilized for milling purposes, and has a support for a boring spindle 36 when the machine is utilized as a boring machine. This member thus serves two functions and the longitudinal adjustment thereof is utilized to position the same for receiving and supporting the pendant 34 in desired relation to the arbor in the one case and is utilized for feeding the boring spindle in the other case.

The boring spindle 36 is journaled in antifriction bearings 37 mounted in the forward end of the member 35 and in a plain bearing 38 mounted in the rear end of the member. The member 35 has dovetailed guideways 39 formed on the bottom thereof for interengagement with complementary formed guide surfaces formed in the top of the carrier and a rack 41 is secured to the underside of the member for interengagement with a pinion 42, rotation of which serves to effect adjustment of the member 35.

A power transmission has been provided for imparting movement to the milling spindle, the boring spindle and the overarm member 35 and this transmission includes in general a common rate determining and direction determining means for the three movable elements and selector means whereby any one of the elements may be connected for power movement.

Figure 2:
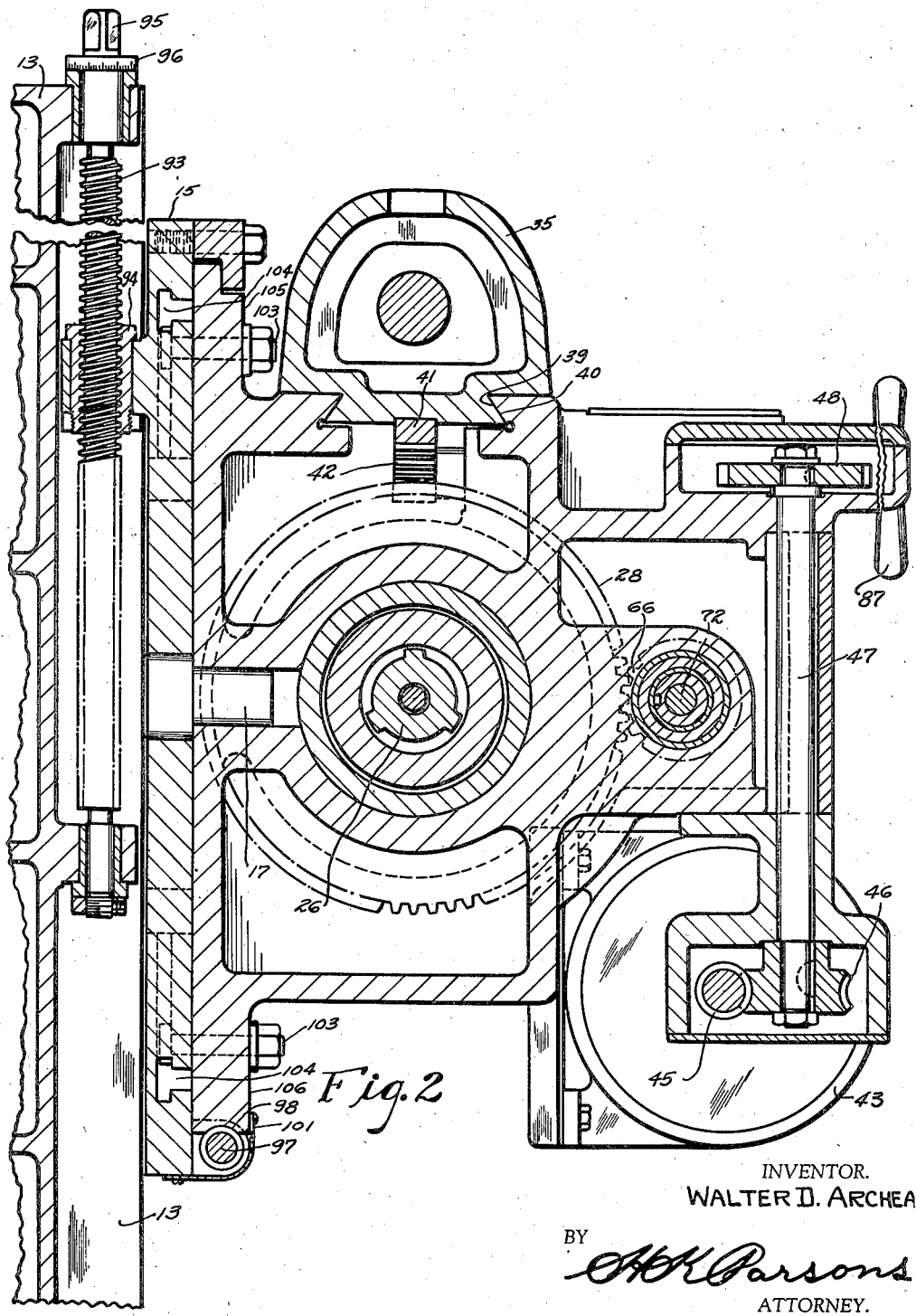
Figure 2 is a vertical section through the carrier of the machine as viewed on the line 2—2 of Figure 1.

This transmission includes a prime mover 43, which, as shown in Figure 1, is mounted on the carrier and is connected as through an Oldham coupling 44 to the worm 45 which meshes with a worm gear 46 as shown in Figure 2. The worm gear is keyed to the lower end of a vertical shaft 47 which is journaled in the carrier and provided on the upper end with a change gear 48. This change gear intermeshes with a second change gear 49 secured to the upper end of a second vertical shaft 50. A cover plate 51 is removable to provide access to these change gears to permit interchanging thereof or substitution of other pairs of different ratio for determining the rate of movement of the final driven part.

The lower end of shaft 50 has a bevel gear 51 which continuously rotates a pair of bevel gears 52 and 53 in opposed directions, these last-named bevel gears being supported for free rotation on a sleeve 54 as more particularly shown in Figure 3. Splined on this sleeve is a slidable clutch member 55 having clutch teeth 56 formed on opposite ends thereof for interengagement with similarly formed clutch teeth 57 formed on opposing faces of the bevel gears. The shifter for this clutch is shown in Figure 5 and comprises a shifter member 58 integrally secured to a shaft 59 which projects through the wall of the carrier and is provided with a manually operable handle 60. In the end of this handle is a spring pressed plunger 61, which, as shown in Figure 1, is adapted to selectively engage notches 62 and 63 for holding the clutch in either one of its driving positions. The sleeve 54 constitutes a common driver for three branch transmissions which extend to the various movable elements and means are provided for selectively connecting any one of these three branch transmissions to the sleeve. As shown in Figure 3, a first slideable clutch member 62 is provided having clutch teeth on opposite faces for selective engagement with clutch teeth 63 of bevel gear 64 for actuating the power feed to the overarm 35; or with clutch teeth 65 formed on the end of gear 66, which gear intermeshes with the bull gear 28 for rotating the milling spindle 18. This clutch is operated by the shifter member 67, Figure 4, which is secured to the end of shaft 68 which has the manually operable handle 69, on the end of which is a spring pressed plunger 70 similar to that shown in Figure 5.

Figure 6:
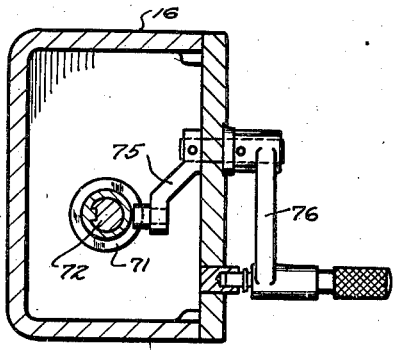
Figure 6 is a detail view showing the selector clutch control for the boring spindle.

Another selector clutch 71 is splined on shaft 72 and has clutch teeth 73 for interengagement with clutch teeth 74 formed in the end of sleeve 57. This clutch is operated by the shifter member 75 shown in Figure 6, having an operating handle 76 similar in construction to the previously described clutch shifting levers.

The shaft 72 is mounted for rotation within the sleeve 54 and extends beyond the end of the carrier, as shown in Figure 1, and into the housing 75 which depends from the rear of member 35. In this housing is journaled a rotatable member 76 having a splined connection with the shaft 72 and interconnected through motion transmitting means 77 to a rotatable member 78 keyed to the end of the boring spindle 36.

From this it will be seen that the boring spindle may be selectively rotated at any time by simply engaging the clutch member 71.

Figure 4:
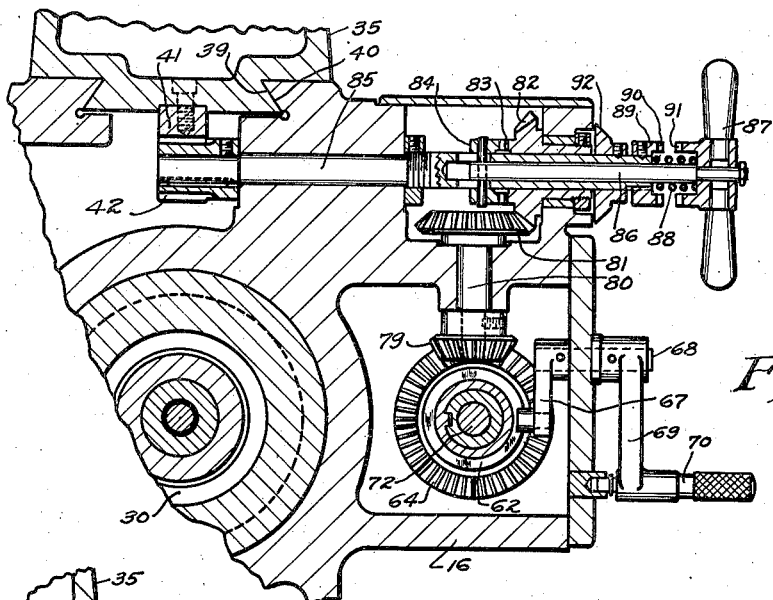
Figure 4 is a detailed section on the line 4—4 of Figure 1 showing the branch transmission train for feeding the boring tool.
Figure 5:
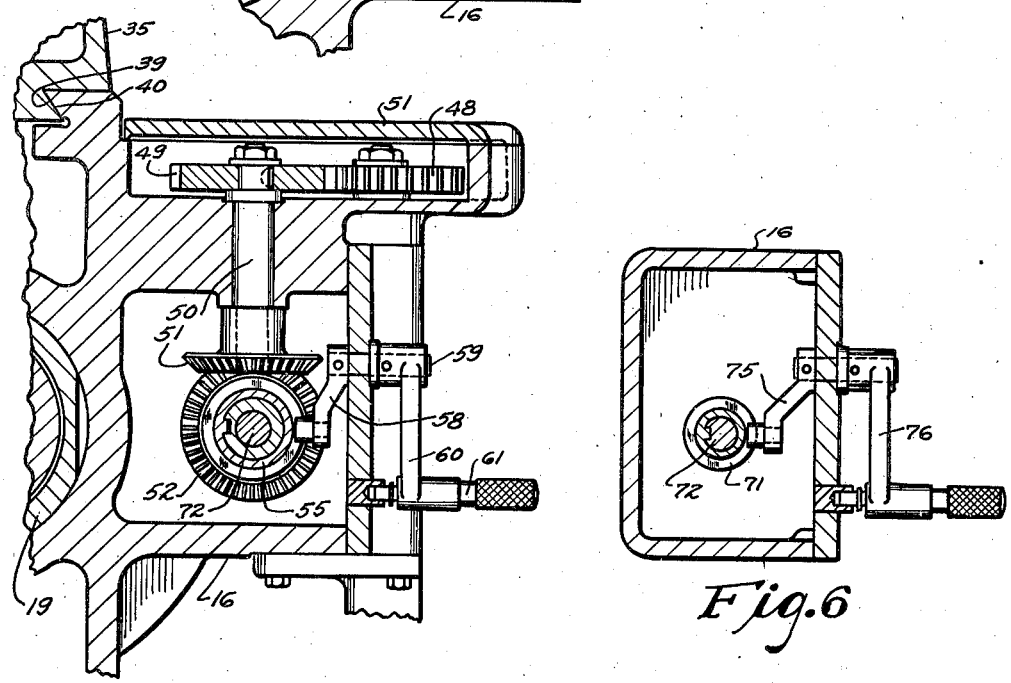
Figure 5 is a detail section on the line 5—5 of Figure 1 showing the means for changing the rate and direction of rotation of either the milling spindle or the boring spindle.

The branch transmission for reciprocating the overarm 35 is more particularly shown in Figure 4 and comprises a bevel gear 79 supported on the lower end of shaft 80 and intermeshing with the bevel gear 64 shown in Figure 3. The upper end of shaft 80 has a bevel gear 81 which interengages with a bevel gear 82 supported for free rotation in the casting. The gear 82 has clutch teeth 83 which may be selectively engaged by similar clutch teeth on the end of clutch member 84 which is fixed for rotation with shaft 85, which shaft has the spur gear 42 fixed to the end thereof. The clutch member 84 is shifted by a central rod 86 which projects beyond the end of shaft 85 and has a hand wheel 87 secured thereto for shifting the rod. A spring 88 is interposed between the handle 87 and the end of shaft 85 for normally maintaining the clutch in an engaged position. The end of the shaft also has a clutch member 89 fixed therewith and has suitable clutch teeth 90 for engagement with clutch teeth 91 formed with the handle 87 whereby upon movement of the shifter rod 86 to the left to disengage clutch 84 and thereby disconnect the power, the clutch teeth 90 and 91 will be interengaged for manual rotation of shaft 85. A graduated dial 92 may also be secured to the end of shaft 85 for indicating the length of movement imparted to the boring spindle. From this it will be seen that the clutch 32 is a selector clutch for determining either rotation of the milling spindle or power feed of the boring spindle.

The carrier may be vertically adjusted by an elevating screw 93, Figure 2, which is journaled at opposite ends in the column 13 and is in threaded engagement with a nut 94 fixed to the rear end of the carrier plate 15. The upper end 95 of the screw is squared or provided with other suitable shape for receiving and operating a removable operating handle. The screw may also be provided with a micrometer dial 96 for indicating small amounts of vertical adjustment.

As previously stated, the carrier is supported on the pin 17 for angular adjustment and its adjustment is effected by a worm 97 which meshes with suitably formed teeth 98 cut in an integral part of the lower end of the carrier as more particularly shown in Figures 1 and 2. The worm 97 is supported on a shaft 99 which extends to the rear of the machine and is provided with an operating handle 100. The carrier also has a plate 101 which is graduated in degrees and co-operates with a fixed pointer 102 whereby the angular adjustment of the milling spindle or the boring spindle may be determined. A plurality of T slots 103 are mounted in arcuate T bolts 103 are mounted in arcuate T slots 104 and pass through upper and lower flanges 105 and 106 of the carrier for clamping the same in various angularly adjusted positions.

A simplified combined boring and milling machine has thus been provided which is simple in construction and inexpensive to build, and which may be readily operated as either type of machine by simply operating the properly selected clutches and without the necessity of making any major changes in the machine structure itself.

I claim:

1. In a combined machine tool, the combination with a support having a work table movable thereon, of a tool carrier, guide ways on the support for receiving said carrier, means for adjusting said carrier relative to the work table, a milling cutter spindle journaled in said carrier, a longitudinally movable member supported on the carrier for movement parallel to the axis of said spindle, said member having guide ways thereon for receiving an arbor support, a boring tool spindle supported in said member, a common prime mover for actuating all of said parts including a main transmission connected to the prime mover and having rate change and reversing means serially arranged therein, and a plurality of selector clutches for coupling the respective movable parts severally to the main transmission.

2. In a machine tool having a work support, the combination of a carrier adjustably mounted with respect to said support, a tool spindle journaled in said carrier for receiving a tool supporting arbor, an overarm member reciprocably mounted in guide ways formed in the carrier, a support on said overarm for the arbor, power operable means self-contained in the carrier for rotating said spindle and moving said overarm including a prime mover, a selector clutch actuable thereby and shiftable to a first position for actuation of the cutter spindle; to a second position for power actuation of said overarm; and to a third position for disconnecting the prime mover from both of said parts.

3. A machine tool having a work support, a column uprising at one side of said work support, a tool carrier mounted on said column, a boring tool spindle, a longitudinally reciprocable member for supporting said spindle on the carrier and for feeding the spindle relative to said work support, transmission means self-contained in the carrier for rotating said spindle and feeding said member including a prime mover, an actuator power driven thereby, co-axial clutches for selectively connecting said actuator for rotation of the spindle, and for power feeding movement thereof, and an additional clutch in serial relationship with one of said clutches for disconnecting the power feeding means, manually operable means for feeding the spindle; and means to simultaneously connect said manually operable means upon disconnection of said power feeding means.

4. A combined machine tool having a bed, a work support reciprocably mounted on said bed, a column uprising from the bed, a carrier adjustably mounted on said column, a spindle journaled in the carrier for rotating a milling cutter, a boring bar reciprocably supported by the carrier having a boring tool spindle journaled therein, guide surfaces formed on the boring bar, complementary guide surfaces formed in the carrier; and an arbor support for milling cutter arbors having guide surfaces complementary to the surfaces of said boring bar, whereby the guide surfaces on the boring bar serve to guide its movement in the carrier when the machine is utilized as a boring machine, and to receive the arbor support when the machine is utilized as a milling machine.

5. A combined milling and boring machine comprising a work table, a carrier, a milling cutter spindle journaled in the carrier, a boring tool spindle, a longitudinally movable member supported by the carrier for journaling and feeding the boring tool spindle, power operable means self-contained in the carrier for actuation of the several parts including a rotatable sleeve, power operable means for reversely rotating said sleeve, a member journaled externally of said sleeve and connectible therewith for rotation of the milling tool spindle, a second rotatable member journaled externally of said sleeve and connectible therewith for reciprocating said longitudinally movable member, and a third member journaled internally of said sleeve and connectible therewith for rotating said boring tool spindle.

6. A combined machine tool having a boring tool spindle; means for supporting and feeding said spindle; a milling tool spindle; power operable transmission means for actuation of the several parts including a rotatable sleeve member, a pair of oppositely rotatable gears surrounding said sleeve, a reciprocable clutch member for selectively connecting said gears for opposite rotation of the sleeve, a second pair of members surrounding said sleeve, one of which is connected for rotation of the milling tool spindle, and the other connected for reciprocating said longitudinal member, a selector clutch for connecting said members for feeding movement of the boring tool; an additional member rotatable within said sleeve, and an additional clutch member for connecting said sleeve to the last member for rotation of the boring tool spindle.

7. A combined machine tool having a work support, a column, a first carrier mounted on said column for relative movement with respect to said support, a second carrier mounted on the first carrier for movement relative thereto, cutter spindles journaled in respective carriers, one of which is adapted to receive and rotate a milling cutter and the other adapted to receive and rotate a boring tool, a prime mover mounted on one of said carriers, means power operable by the prime mover for actuating either spindle, and additional means selectively operable by the prime mover for effecting relative movement between the carriers.

8. A machine tool having a bed, a work table reciprocably mounted upon the bed, a column uprising from the bed, a carrier mounted on the column for vertical movement relative to the table, a longitudinally adjustable support mounted on the carrier for movement in an angular direction with respect to said vertical movement, tool spindles journaled in the carrier and the support respectively, a prime mover mounted on one of said movable members, a rotor selectively connectible for opposite rotation by the prime mover and selector clutches for connecting said rotor with either of said spindles for power rotation thereof.

9. A machine tool having a work support, a column uprising in one side of said work support, a tool carrier mounted on said column for relative adjustment, a boring tool spindle, a longitudinally reciprocable member for supporting said spindle on the carrier and for feeding the spindle relative to said work support, transmission means self-contained in the carrier for rotating said spindle and for feeding said member including a prime mover, an actuator oppositely driven thereby, co-axial clutches for selectively connecting said actuator to rotate the spindle or feed said member, and an additional clutch in serial relationship with one of said clutches for disconnecting the power feeding means from the prime mover.

WALTER D. ARCHEA.